United States Patent [19]

Brewer

[11] Patent Number: 4,858,356
[45] Date of Patent: Aug. 22, 1989

[54] SLIDE SORTER AND VIEWER

[76] Inventor: George W. Brewer, 65 Gray Cliff Rd., Newton Centre, Mass. 02159

[21] Appl. No.: 218,499

[22] Filed: Jul. 5, 1988

Related U.S. Application Data

[63] Continuation of Ser. No. 942,357, Dec. 16, 1986, abandoned.

[51] Int. Cl.⁴ .............................................. G02B 27/02
[52] U.S. Cl. .......................................... 40/366; 40/361
[58] Field of Search ................. 40/361, 362, 363, 366, 40/367

[56] References Cited

U.S. PATENT DOCUMENTS

| | | | |
|---|---|---|---|
| 2,849,814 | 9/1958 | Rideout | 40/367 |
| 2,908,094 | 10/1959 | Mast | 40/367 |
| 3,200,523 | 8/1965 | Zagel | 40/367 |
| 3,217,436 | 11/1965 | Van Wormer, Jr. | 40/367 |
| 3,419,984 | 1/1969 | Sakamoto | 40/367 |
| 4,226,038 | 10/1980 | Ashworth | 40/361 |

Primary Examiner—Gene Mancene
Assistant Examiner—J. Hakomaki
Attorney, Agent, or Firm—Bromberg & Sunstein

[57] ABSTRACT

A device for the simultaneous viewing of numerous photographic slides has two rows of periodic ridges spaced parallel to each other. The ridges are shaped so that one can grasp a stack of slides between the thumb and forefinger and spread them along the ridges in a single sweeping motion. In one embodiment, a light source is included in between the ridges.

11 Claims, 3 Drawing Sheets

SLIDE SORTER AND VIEWER

This is a continuation of co-pending application Ser. No. 942,357 filed on Dec. 16, 1986.

DESCRIPTION

This invention relates to devices for viewing and sorting of transparencies, such as photographic slides and the like.

BACKGROUND OF THE INVENTION the past, there have been numerous attempts to construct a device which would enable one to view a number of photographic slides simultaneously. Reference is made to U.S. Pat. No. 3,611,600, issued to Seebald, for an example of such a device. This patent describes a turret tray with a slide storage cartridge that can be moved to receptacles designed to receive a plurality of slides. U.S. Pat. No. 3,419,984, issued for an invention of Sakamoto, a device which has a sliding storage chamber that spreads a plurality of rows of slides down an inclined plane.

The slide sorters in the past have all depended upon mechanical chambers to spread the slides. Further, the equipment involved is bulky, and requires its own light source for viewing the slides.

DISCLOSURE OF THE INVENTION present invention provides an easy to use, portable, manually operated slide sorting and viewing device, enabling one to view numerous slides simultaneously, and rearrange them easily, if desired.

During the entire process, the slides remain in their conventional slide mounts and are protected from damage. The invention features a slide support arrangement which is slightly less wide than the width of a slide mount. In a preferred embodiment, periodic ridges, arranged along the support arrangement are spaced less than the width of a slide mount. The ridges are not substantially higher than the thickness of a slide mount. In using the invention, one may spread the mounted slides along the rails by guiding a stack of slides with the thumb and forefinger. Restacking of the slides is equally convenient, as the spacing of the ridges enables one to manually re-stack them using a single sweeping movement.

DESCRIPTION OF THE INVENTION

Figure 1:
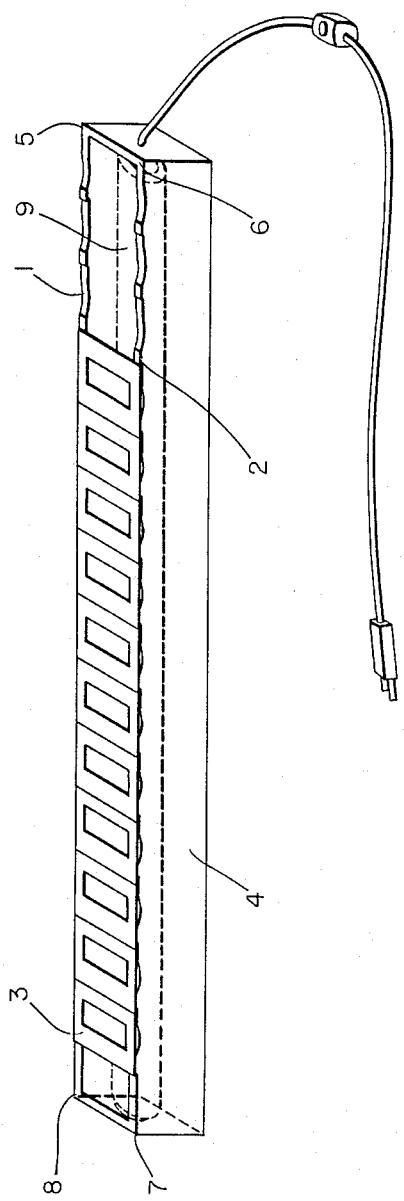
FIG. 1 shows a preferred embodiment of a slide sorter in accordance with the present invention, equipped with an optional flourescent light.

Referring to FIG. 1, in a preferred embodiment of the invention, there are two parallel slide supports 1 and 2 which are separated by a width less than the width of a photographic slide mount 3, which is typically about 2 inches (approximately 5 cm). The dimensions given are approximately those of typical 35 mm slide mounts. However, it is appreciated that the dimensions may vary for other types of photographic transparencies, and concommitant variations in dimensions are envisioned. The slide support may also be the outer edge of a box 4 or the slide support may instead be suspended at corners 5–8 by vertical legs. The slide support may suitably be made out of a rigid material such as metal, wood, plastic, Lucite ®, or the like. It may be a solid object, in which case, it would be desirable to have at least the central section of the object, as well as the topmost surface to be made from a translucent material. If desired, a flourescent light 9 may be situated inside the box 4 so that the transparencies will be illuminated from the rear, or device in accordance with the invention may be placed on top of an illuminated surface such as a light table. If desired, other elements helpful for viewing the slides, such as a magnifying lens, may be attached to the box or legs.

Figure 2:
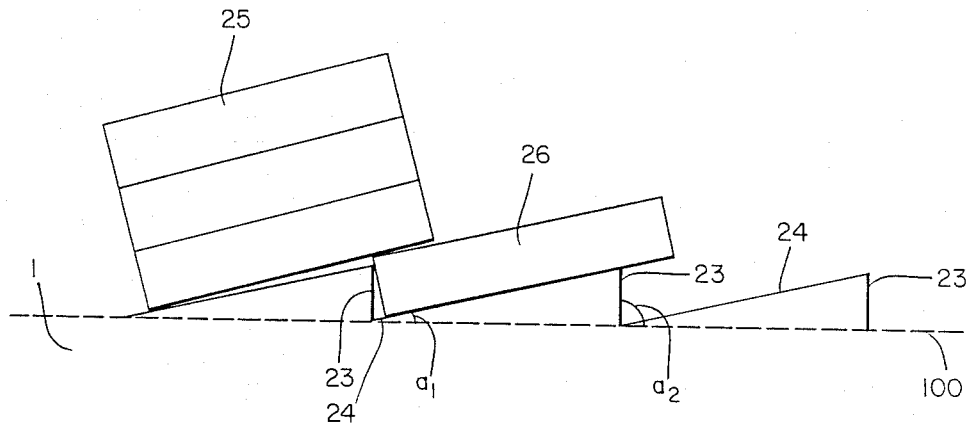
FIG. 2 shows a close up of slides being spread along the rails of the embodiment of FIG. 1.

FIG. 2 shows an enlarged view of one portion of the slide support surface. To illustrate the principle of operation, the slide mount thickness and ridge heights have been exaggerated. The slide support has numerous ridges spaced periodically. For convenience, only ridge 20 will be described in detail, but it is to be understood that all the ridges on each slide support have the same details. Swipe axis 100 is a line of reference which runs along the length of the support. Ridge 20 is a roughly triangular protuberance rising along the edge of slide support 1, made of a first surface 24 and a second surface 23. Each of the first surface 24 and the second surface 23 intersects the swipe axis 100 at angles $a_1$ and $a_2$, respectively that are not substantially more than approximately 90°. Each ridge is less than the length of a photographic slide mount long, or somewhat less than about 2 inches (approximately 5 cm). The second surface 23 projects from the edge of the slide support slightly less than the thickness of a slide mount 26 or slightly less than 0.04 inches, in the case of a cardboard mount. Commercially available slide mounts are typically made of cardboard or plastic, although sometimes glass is used. Of course, depending on the materials used, the thickness of the mount will vary. Thus if one were to be using the invention only with slides mounted in plastic, for instance, it may be advantageous to adjust the height of the second surface accordingly. If the invention was intended to be used with different types of mounts, however, the height of the mount rest should be that which is suitable for the thinnest mount. The configuration of first surface repeats along the length of the arrangement.

As the width of the entire device, as discussed above, is somewhat less than 2 inches, one can simply grasp a stack of mounted slides between the thumb and forefinger and spread the stack 25 over the ridges, following swipe axis 100. The bottom mount moves along the first surface 24 until it reaches the second surface 23. Due to the height and spacings of the ridges, the bottom mount will fall into the first space, the next mount into the second space, and so on. The slides can be quickly and evenly spread in one sweeping motion. Further, due to the fact that the slides are placed so that they overlap, they can be gathered back into a single stack when the viewing session is finished by lifting the last slide, which in turn raises the next.

Figure 3:
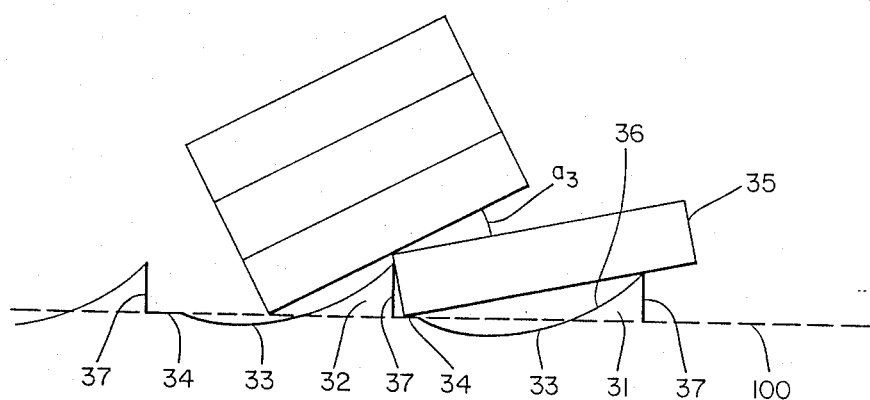
FIGS. 3–5 show alternate arrangements of ridges in accordance with the present invention.
Figure 4:
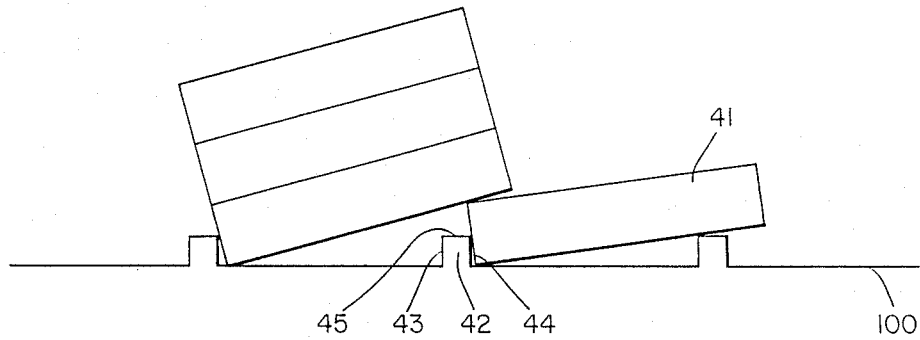
Figure 5:
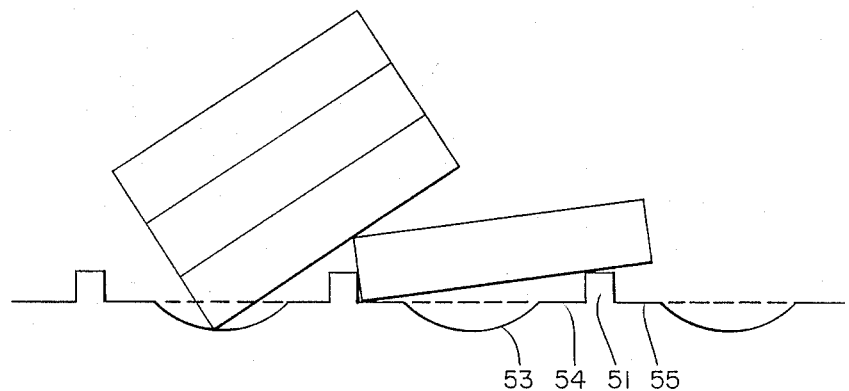

FIGS. 3–5 show other embodiments of the ridges which are also contemplated by this invention. As before, only one of each of the plurality of ridges present will be described below, but it is understood that the structures are repeated periodically along each slide support arrangement.

Figure 6:
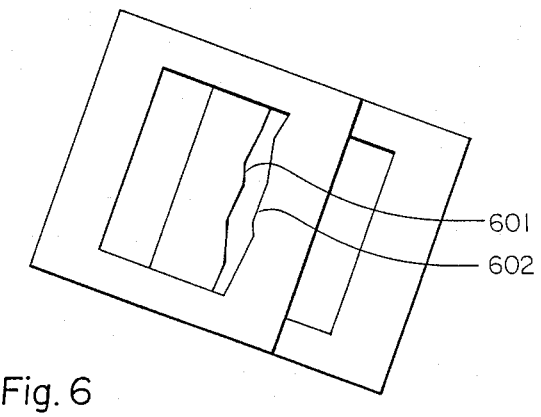
FIG. 6 shows slide mounts that have experienced warping.

In FIG. 3, projections 31 and 32 are separated by a shallow recess with a smooth surface 33 and corner 34. Projection 32 is somewhat shorter than the thickness of the mount 35. Projection 31 is composed of two surfaces, a convex arc 36 and second surface 37. Surface 37 intersects swipe axis 100. Arc 36 is an upward continuation of shallow recess 33 which intersects surface 37. Mount 35 is supported at only two places, corner 34 and at the top of projection 31, rather than along its entire edge as was the case in FIG. 2. When spreading the slides, the bottommost slide in the stack moves along recess 33 and plane 34 until it reaches the surface 37. The slides are lifted off the bottom of the stack of slides at angle $a_3$. There is a particular advantage to the design of the ridges as shown in FIG. 3. Often, particularly when cardboard mounts are used, the mount may experience some warping as shown in FIG. 6. The edges of the aperture of the bottommost mount 601 in the stack may engage the edges of the aperture of the mount on top of it 602. This would result in more than one mount per ridge area. However, by tracing a path which includes a recess with a smooth surface 33, such as is illustrated, the mount on the bottom of the stack is lifted off a plane horizontal to the stack by angle $a_3$. The deeper the recess 33, the greater angle $a_3$. If $a_3$ is sufficiently deep, then the bottommost mount will not engage the aperture of the next mount, or, if already engaged, will free itself.

In FIG. 4, the ridges are symmetrical protuberances, separated by a distance of less than the width of photographic mount 41. Ridge 42 rises from the ridge by a height of less than the width of the photographic mount 41. This ridge has two surfaces 43 and 44 which are of equal height and rise parallel to each other perpendicular to the rail surface. They are connected by bridge 45. FIG. 5, which shows another embodiment has ridge 51 which is similar to those in FIG. 4, in that it is also symmetrical, and has parallel sides perpendicular to swipe axis 100, but the slide support means differs from that in the previous figure in that the ridges are separated by a shallow smooth recess 53 with planes 54 and 55 on either side. An added advantage to a configuration as in either FIG. 3 or 4 is that the stack of slides can be spread either from right to left or from left to right. It is noted that the configuration of FIG. 5 incorporates all the advantages of the previously described configurations; the shallow recesses prevent the engagement of more than one mount, even if warping is present, and the symmetrical design allows one to spread the mounted slides either from right to left or from left to right.

Accordingly, while the invention has been described with particular reference to specific embodiments thereof, it will be understood that it maybe embodied in a variety of forms diverse from those shown and described without departing from the spirit and scope of the invention as defined by the following claims.

What is claimed is:

1. A device for simultaneous viewing and sorting of a plurality of photographic transparencies, each transparency housed in a mount having an aperture through which the transparency may be viewed and having a thickness, a width, a length, the device comprising:

first means for providing support for a plurality of mounts in a linear and generally horizontal shingled configuration, such means having a width not substantially exceeding the width of a mount and having a width not substantially exceeding the width of a mount and having a support surface with an axis hereinafter called the swipe axis, such surface being contacted by a portion of each of the mounts when they are in shingled configuration; and the first means further having a plurality of periodically spaced ridges in the slide support surface, the height of each ridge not substantially exceeding the thickness of the mount, and the distance between two adjacent ridges being less than the length of the mount, such that in may (i) grasp a stack of transparencies housed in mounts to be viewed and sorted, between two fingers, and in a single motion parallel to the swipe axis, while the two finger span the first means, engage each successive mount against a different ridge and thereby cause the mounts to become arranged in a shingled configuration without a handler box and (ii) regather the mounts so arranged into a single stack by hand without a handler box.

2. A device according to claim 1, further comprising an integrally formed structure embodying the first means.

3. A device according to claim 1, wherein the first means includes a pair of spaced-apart rails disposed parallel to the swipe axis.

4. A device according to claim 1, wherein each ridge has first and second surfaces, such surfaces intersecting the swipe axis at an angles not substantially more than 90°.

5. A device according to claim 3, wherein the first means includes a central member, made of a translucent material, disposed between the two rails.

6. A device according to claim 4, further comprising a shallow recess in the slide support surface disposed between each pair of adjacent ridges.

7. A device according to claim 1, wherein each ridge includes a pair of symmetrical projections, so that slides may be shingled on the first means by motion in either direction along the swipe axis.

8. A device according to claim 7, further comprising a shallow recess in the slide support surface disposed between each pair of adjacent ridges.

9. A device according to claim 8, wherein the symmetrical projections form angles of approximately 90° with the swipe axis.

10. A device according to claim 9, wherein each shallow recess is disposed adjacent to a planar surface between each pair of adjacent ridges.

11. A device according to claim 1, further comprising a shallow recess in the slide support surface disposed between each pair of adjacent ridges.

* * * * *